United States Patent Office 3,502,748
Patented Mar. 24, 1970

---

3,502,748
MIXED ANHYDRIDES PRODUCED BY THE REACTION OF PHOSPHORUS ACIDS AND POLYAMINO POLYCARBOXYLIC ACID CHELATING AGENTS
Frederick C. Bersworth, East Orange, N.J., assignor to Weston Chemical Corporation, Morristown, N.J., a corporation of New Jersey
No Drawing. Filed Oct. 27, 1966, Ser. No. 589,861
Int. Cl. C07f 9/02, 9/08, 15/02
U.S. Cl. 260—926                     11 Claims

ABSTRACT OF THE DISCLOSURE

Anhydride products of phosphorus acids with synthetic polyamino polycarboxylic acid chelating agents to develop a chemical union between a phosphorus acid moiety and an acid moiety of the chelating agent so that a carbon-oxygen-phosphorus combined moiety is present in the molecule to form a polydentate chelating agent. The ratio should be at least one mole of —CH$_2$COOH group and one mole of phosphorus acid ranging to an excess phosphorus acid sufficient to react with each of the

—CH$_2$COOH groups on the chelating agent. Phosphorus acids are those derived from phosphorus oxides and water and range from phosphorus pentoxide with minimal water, i.e., excess P$_2$O$_5$, to all degrees of dehydration and polymerization of the phosphorus. Method of formation is direct: the phosphorus acid provides a good solvent for the chelating agent. Reaction temperatures not exceeding 150° C. are adequate for forming the compounds, whether it be with excess chelating acid or phosphorus acid.

DETAILED DESCRIPTION OF THE INVENTION

This invention is concerned with the preparation of novel chelating agents based upon phosphorus acids and synthetic polyaminopolycarboxylic acid chelating agents, whereby through a condensation reaction certain sequestering and chelating ability of the phosphorus acids and of the chelating agents are combined in a single molecule to make a composite chelating agent, characterized by its having many ligands suitable for reaction with metallic ions.

It is well known that nitrilo triacetic acid (NTA), ethylenediaminetetraacetic acid (EDTA) and related compounds based on nitrogen and alkyl-spaced nitrogens substituted with acetic acids moieties, e.g., $$\begin{array}{ccc} CH_2COOH & CH_2COOH & CH_2COOH \\ | & | & | \\ N-CH_2COOH, & --, N-Alkyl-N-Alkyl-N, -- \\ | & | \quad | & | \\ CH_2COOH & CH_2COOH \; CH_2COOH & CH_2COOH \end{array}$$

wherein the compounds are based on one, two, three, four or more alkyl groups of 2,3,4 carbon atoms spacing the nitrogens, are versatile and effective sequestering agents for a variety of metals. They suffer from a number of drawbacks, however, in that they crystallize out of strongly acid solution at pH 3, or lower, e.g., ethylenediaminetetraacetic acid (EDTA), so that they cannot be used effectively at very low pH. Also, they do not sequester the alkaline earth metals below pH 7.

Inorganic phosphorus acids, phosphoric, pyrophosphoric, metaphosphoric, and phosphorus oxides, with various amounts of water and polyphosphates on the other hand, while they are cheaper than EDTA and its homologues, suffer from several drawbacks as sequestering agents. The stabilities of the metal complexes they form with various metals are lower than those of EDTA, so that sequestration is not nearly so effective, particularly at high pH or in the presence of very strong precipitation agents. Also, the phosphorus acids and their salts are hygroscopic and consequently develop some problems in handling. However, they are more soluble than EDTA and do not precipitate in the presence of strong acids. Also, the sequestration of the alkaline earths by the polyphosphates, though at a lower level, extends further into the acid region than does that by EDTA and other polyaminopolycarboxylic acids.

An object of this invention is to prepare anhydrides of EDTA and phosphorus acids, which combine advantages of both types of sequestering agents, while eliminating some of their disadvantages. The compounds described as part of this invention are crystalline and non-hygroscopic, are soluble over the whole pH range, and combine the sequestering properties of EDTA and the phosphorus acids and polyphosphates.

Other objects and advantages of the invention will in part be obvious and in part appear hereinafter.

The invention, accordingly, is concerned with condensed products of phosphorus acids and synthetic polyaminopolycarboxylic acids, of which ethylenediaminetetracetic acid may be considered the type acid, the condensation being such that a mixed anhydride of the two components is formed, wherein there is chemical union between the two moieties, thereby forming a compound which has the amino acid and the phosphorus acid functions, all of which can be schematically represented as follows:

$$\left[ A \right]_x \left( \begin{array}{c} O \\ \| \\ P \\ | \\ OH \end{array} \right)_y \begin{array}{c} O \\ \| \\ P-OH \\ | \\ OH \end{array}$$

wherein A is the moiety from the amino acid and is represented by $$\begin{array}{c} CH_2COM \\ | \\ N-R \\ | \\ CH_2COM \end{array}$$

wherein,
R is $$\left[ \left( (CH_2)_n-N \begin{array}{c} \\ | \\ CH_2 \\ | \\ COM \end{array} \right)_m (CH_2)_n-N \begin{array}{c} \\ | \\ CH_2 \\ | \\ COM \end{array} \right]_o -CH_2COM$$

m=0-4
m=0-4
o=0,1
n=2,3 and —COM is independently selected from the group consisting of COOH, —COONa, —COOK, —COONH$_4$ and —COO alkyl, not more than two COM's being —CH$_2$OH, and x is a small integer from 1 to 5
y is an integer from 0–5

The simple mixed anhydride is formed by the direct union of a carboxyl acid phosphoric acid moiety (y=0) to give the structural type $$\begin{array}{c} O \quad O \\ \| \quad \| \\ R-C-O-P-OH \\ | \\ OH \end{array}$$

which with nitrilotriacetic acid, the simplest case with x=1, y=0, gives $$\begin{array}{c} HOOCCH_2 \\ \diagdown \\ N-CH_2C-O-P-OH \\ \diagup \quad \| \quad \| \\ HOOCCH_2 \quad O \quad O \\ \qquad\qquad\qquad | \\ \qquad\qquad\qquad OH \end{array}$$

in a 1:1 molar ratio.

For the phosphorus acid moiety, I prefer to use phosphoric acid or pyrophosphoric acid, but it is possible to use acid forms of alkali metal phosphates, i.e., monohydrogen, dihydrogen forms, and as the polyaminopolycarboxylic acid moiety, I use any of the compounds defined, i.e., acids, salts, and esters.

Typical of the compounds are nitrilotriacetic acid, ethylenediaminetetraacetic acid, diethylenetriamine pentaacetic acid, hydroxy ethyl ethylenediamine triacetic acid, and the diethylene triamine acetic acid compounds and triethylene tetramine acetic acid compounds as such, with one or two hydroxyethyl groups replacing one or two acetic moieties on those molecules. It is understood, of course, that propionic acid moieties may be used in place of acetic acid moieties.

When the amino acid contains an aliphatic hydroxyl group ($R=-CH_2OH$). The dehydration reaction occurs preferentially with this group to produce an ester, or that the phosphate is combined with the amino acid in the following way:

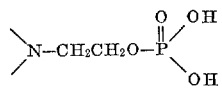

or

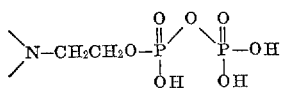

The nature of the compounds and their properties as well as their usefulness in forming metal chelates will be better understood by reference to the following specific examples illustrating the preparation of typical compounds coming within the scope of the invention:

EXAMPLE I

To 10.0 grams of pure $H_3PO_4 \cdot 1/2H_2O$, heated to 75° C. was added 4.0 grams of dry ethylenediaminetetraacetic acid (EDTA). The reaction mixture formed a clear melt, and then in five separate portions of the mixture a small amount of $P_2O_5$ was added in amount from 0.2 to 2.0 grams.

The reaction product, after 30 minutes of heating at no more than 70° C., was a clear, very pale yellow syrup. It is soluble in hot water, and remains dissolved when the solution is cooled. When cool, it is viscous, has a pH of about 2, and foams on being shaken. The compound formed is strikingly different from the starting materials, particularly with respect to solubility.

When a small amount of water is added, a hydrated crystalline form of the condensation product is obtained. This material dissolves in hot water or a large amount of cold water.

EXAMPLE II

As an indication of the range of possible compositions, the following varying amounts of EDTA were added to a fixed quantity (50.0 grams) of $H_3PO_4 \cdot 1/2H_2O$. The increasing temperatures were employed to drive the dehydration reaction further and further so that the additional EDTA would be reacted.

TABLE I

| Temp., ° C.: | EDTA added in each step, grams | Observation |
| --- | --- | --- |
| 50 | 5.0 | Water-clear. |
| 60 | 2.0 | Do. |
| 70 | 2.0 | Do. |
| 80 | 2.0 | Sl. cloudy; clears gradually. |
| 100 | 2.0 | Do. |
| 110 | 2.0 | Sl. cloudy; bubbles formed plus odor of $CH_2O$. |
| 110 | 3.0 | Cloudy at first; then clears. |

The final temperature was allowed to reach 132° C., at one hour from the first addition of EDTA. The final solution was again pale yellow, but quite clear.

As in Example I, the product is soluble in hot and cold water, but forms crystals when a small amount of water is added. The clear aqueous solution has a pH of about 2.

EXAMPLE III

To 100 grams $H_3PO_4 \cdot 1/2H_2O$ at 60° C., 20.0 grams of EDTA is added with stirring. There is a little foaming, but no odor is detectable. After 10 to 15 minutes, 2.0 grams of $P_2O_5$ is added and the mixture is heated at 60° for 15 minutes more, and allowed to cool. The clear waterwhite viscous syrup obtained forms hydrated crystals when water is added slowly. It has the same solubility properties as the products of Examples I and II, although the material obtained in this case contains more phosphoric acid.

EXAMPLES IV-VI

In tests parallel to those of Examples I–III, nitrilotriacetic acid was used in place of EDTA. Similar reaction products representing similar degrees of reaction with phosphoric acid were obtained.

Further examples

In the foregoing examples, I have used $P_2O_5$ as a final dehydrating agent for the liquid composition of NTA or EDTA and phosphoric acid. It was noted during these experiments that $P_2O_5$ can char easily if added to the solution hot or cool. $HPO_3$ seems to be a better form of phosphoric anhydride to use.

$$(P_2O_5 + H_2O = H_2P_2O_6 = 2 \cdot HPO_3)$$

The pearls of $HPO_3$ may be added to the phosphoric or polyphosphoric acid prior to the additions of carboxy methyl derivatives of amines, or added after the addition of the amino acids; for example, the following experiment was carried out:

EXAMPLES VII-X (1) 4 Erlenmeyer flasks, each containing 50 grams of $H_3PO_4$ were prepared.
(2) To these were added:

Flask 1: 15 grams of EDTA
Flask 2: 15 grams NTA
Flask 3: 15 grams hydroxyethyl ethylenediaminetriacetic acid
Flask 4: 15 grams hydroxy ethyl diglycine.

All four flasks were heated in an air bath to 75° C. and kept at this temperature for five hours. There was no change in the water-clear color of the solutions.

This solution, a resin, is a very effective chelating compound for di- and poly-valent metals. However, this composition may be condensed further by the oxidation of $H.PO_3$, or the pearls $H.PO_3$ may be added to the ortho phosphorous acid prior to the introduction of the amino carboxy methyl compound.

Following this there was added to each, 3 grams of $HPO_3$ pearls. The pearls dissolved. There was no change of color, nor was there any odor of either $CH_2O$ or acrylic smell.

In a second series, using the same proportions, the $HPO_3$ pearls were dissolved first in $H_3PO_4$ and at 60° C., and then the carboxy methyl derivatives of the amino acids added. The solutions remained clear. At temperature of about 110° C. the discharge of $CO_2$ and $CH_2O$ was noticed.

This decarboxylation and demethylation increases with increased temperature and can be driven to practical completion with time and at any temperature from 110° C. The products of such decomposition reactions differ from the anhydrides in that the $Fe^3$ chelates are colored from yellow to wine red depending upon the pH of the chelate solution. In this reaction, the chemical bonding is probably:

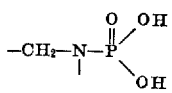

which probably occurs as follows

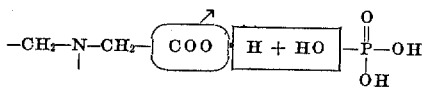

The reactions can be postulated as follows:

The di-EDTA compound of phosphoric acid is developed schematically below. With heating, as shown in the various examples, under various conditions, there is a condensation with loss of molecular water. The end products result:

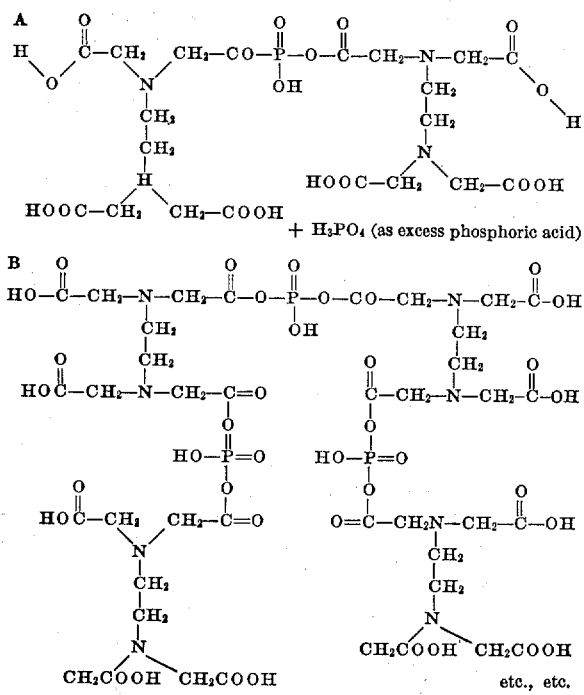

+ $H_3PO_4$ (as excess phosphoric acid)

etc., etc.

$H_3PO_4$ can be polymer phosphoric acid etc. when hydroxyl groups are present on the organic compound, then ester+anhydrides are formed as per equations.

The liquid compositions enumerated in Examples VII–X may be vacuum dried in film form. The product is a glassy film. The precise properties of the film depend (1) on the amount of organic sequestering agent added, (2) the degree of vacuum applied, and (3) on the type of organic compound used; for example, the hydroxyl containing carboxyl methyl derivatives are soft films to very viscous liquids depending on the number of hydroxyls present. The non-hydroxyl containing carboxy methyl reaction products are glassy films.

A phosphoric acid was made up as follows:

$H_3PO_4$—50 grams
$H.PO_3$—10 grams (pearls).

The pearls gradually disintegrate at room temperature, but do not form a clear solution. The composition fumes in air. Heat to 70°. It is essentially a solution, but still not clear. Add 20 grams of NTA all at once; no decomposition. The well-dispersed mixture is heated with agitation and under reflux.

Observations 2 hours at 70–80° C.—a liquid phase with white precipitate.

1 hour at 100° C.—less precipitate.

1 hour at 120° C.; no decomposition; very little precipitate left.

Cool and decant into beaker. The decanted resin is crystalline, non-hygroscopic; soluble in cold water from which crystals are obtained on standing.

The upper liquid fraction, too, is soluble in water, and crystallizes on standing.

The reaction products of all ten examples cited are not soluble in methanol, but are precipitated, forming a white, easily filtered solid. The solids are soluble in water; by preference, hot water. On standing, glassy, well-formed hydrated crystals are obtained. The reaction products are soluble in aqueous alkali metal bases, NaOH, KOH, $NH_4OH$, etc.

It is apparent from the solubilities of the products of Examples I–X described above, that they are not simple mixtures of the components. If this were the case, NTA and EDTA would immediately separate from the water solutions as a crystalline material or as their zwitter ions. The reaction products appear to be condensation products (i.e. mixed anhydrides) of NTA or EDTA, or polycarboxylic acid used, and $H_3PO_4$.

The products are actually mixed anhydrides of EDTA and $H_3PO_4$. If salt compounds had been formed, they would merely go over to EDTA and monophosphate salts as the pH was raised slightly, and the acid form of EDTA would merely crystallize from such a solution (which would still have a pH of about 2).

The bulk of the material is believed to be a highly cross-linked anhydride, in which a majority of the acetic acid groups are randomly cross-linked through bi-functional phosphoric bridges, illustrated with the type compounds shown.

At higher ratios of $H_3PO_4$ to EDTA, the structure is modified by larger proportions of pyrophosphate and even polyphosphate bridges. Hence it is seen that as the ratio of $H_3PO_4$ to EDTA increases, the relative proportion of polyphosphate linkages also increases. Although NTA and EDTA are chosen here as the primary examples, because of the beneficial effect of mixed anhydride formation on the solubility of EDTA acid, the present invention also applies to a wide variety of amino polycarboxylic acids. Examples of compounds that will undergo the same type of mixed anhydride formation that is represented by Examples I, II, III are the following:

EXAMPLE XI

NTA nitrilotriacetic acid

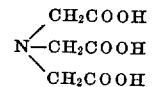

Reacted with phosphinic acid under the conditions of Example I (or II or III).

EXAMPLE XII

HEDTA hydroxyethylethylenediamine triacetic acid

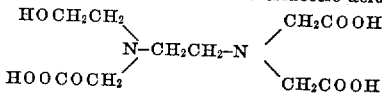

Reacted with a phosphoric acid under the conditions of Example I (or II or III).

EXAMPLE XIII

DTPA Diethylene triamine pentaacetic acid

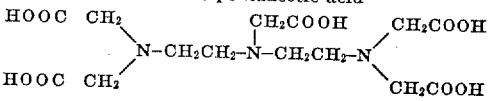

Reacted with a phosphoric acid under the conditions of Examples I, II, or III.

EXAMPLE XIV

DCTA 1,2-diaminocyclohexane-tetraacetic acid $$\begin{array}{c}
HOOCCH_2 \\ \diagdown \\ N \\ \diagup \\ HOOCCH_2
\end{array}
\begin{array}{c}
CH-CH \\ \diagup \phantom{xx} \diagdown \\ CH_2 \phantom{xxx} CH_2 \\ \diagdown \phantom{xx} \diagup \\ CH_2-CH_2
\end{array}
\begin{array}{c}
\phantom{x} CH_2COOH \\ \diagup \\ N \\ \diagdown \\ \phantom{x} CH_2COOH
\end{array}$$

Reacted with a phosphoric acid under the conditions of Examples I, II, III.

The amount of cross-linking also increases with the temperature, which affects primarily the phosphate group. Thus, at low temperature, the mixed anhydrides will contain a number of terminal phosphoric acid groups, which will then condense with the elimination of water.

Thus, in the extreme case, the structure can be varied continuously with production of increasing numbers of phosphoric anhydride groups until it approaches the glassy phosphates in structure and properties, but also exhibits the effect of the presence of the organic chelate moiety.

I prefer (but the composition is not limited thus) to use excess phosphoric acid. It is a good solvent for the amino acids and the condensation products. Also, it prevents superheating and decomposition of the organic moieties.

Similar structures and compounds can be prepared by starting directly with the condensed phosphates, such as pyrophosphoric acid, and acid forms of tripolyphosphate and the glassy phosphate. The products obtained are essentially the same as those outlined above, but less water is eliminated in the condensation process, and the products can be obtained with considerably less heating.

In the foregoing examples, I have shown that carboxy methyl derivatives of ammonia or amines: (1) may be condensed with phosphoric acid at various temperatures, and (2) that such condensation can be enhanced by the addition of phosphoric acid anhydrides, for example, $H.PO_3$ or $P_2O_5$. I have noted in the experiments that temperatures above about 120° C. tend to liberate $CH_2O$ and other gaseous products. It may be noted here that the products derived at such temperatures, and in spite of decomposition, do not seem to be of diminished usefulness. However, it is desirable to avoid decomposition. One good and effective way is to use a water solution of the amino acid-phosphate composition. Unlike $H_2SO_4$, phosphoric acid does not form solutions with tertiary amino acids in water as will be noted in the following examples:

EXAMPLE XV

The following ingredients were mixed in the amounts shown:

$H_3PO_4$ (86%)—50 grams
Water—50 milliliters
NTA (nitrilotriacetic acid)—10 grams In open beaker, stirrer, and heated on a hot plate.

This composition is a slurry and does not form a clear solution until the temperature reaches about 95 to 100° C. and about ⅓ of the water has evaporated. When all water has evaporated to a net weight of 55 grams, the melt is clear, slightly yellow, but it has no odor of decomposition.

EXAMPLE XVI

The following ingredients were mixed in the amounts shown:

$H_3PO_4$ (86%)—100 grams
Water—250 milliliters
NTA—30 grams

The reaction was conducted as in Example XV.

As in Example XV, the mixture remains a slurry until water is evaporated to about ½ by total volume. Then a fusion is noted. The balance of the water is evaporated at comparatively low temperature, 100 to 105° C., until the net weight is 100 grams total. The product is a heavy, slightly yellow syrup which does not crystallize on long standing.

EXAMPLE XVII

EDTA may be used in place of NTA as in Examples XI and XII.

$H_3PO_4$ (85%)—50 grams
Water—150 milliliters
EDTA—15 grams

The reaction is heated, and there is no solution until practically all water is evaporated. The solution which finally forms is water-white and without odor of formaldehyde or other products of decomposition. It was noted during this experiment that the solids (before solution) differed from EDTA acid. They formed feathery solids in water tending to rise to the surface.

The $Fe^3$ chelate of these products was water-white at pH 8. The final net of the condensation product was 64 grams.

All of the end condensation products obtained by means of water solutions, may be further condensed by the addition of phosphoric acid or phosphoric oxide, $P_2O_5$.

Additions of phosphoric acid and amino acid anhydrides, $H.PO_3$ or $P_2O_5$, may be made either at room temperature or only very low temperature.

The condensates illustrated in the examples exhibit remarkable stability in even dilute solutions and at pH values of 2 to 2.5, at which values EDTA acids or NTA acids normally precipitate.

The hydroxyl analogues of the NTA or EDTA type amino acids, for example, hydroxy ethyl di-glycine, di-hydroxy ethyl glycine, hydroxy ethyl ethylenediamine tri acetic acid, di-hydroxy ethyl ethylenediamine di-acetic acid, behave somewhat differently from those of the non-hydroxyl series. They dissolve more readily in phosphoric acids at low temperatures and quite readily in phosphoric acid water mixtures. These hydroxy compounds are, per se, soluble in water and very soluble in hot water, with formation of lactones. The compounds are very reactive with phosphoric acids forming (1) esters of phosphoric acid, and (2) in the presence of excess phosphoric acid, anhydrides, in accordance with the following equations:

$$\begin{array}{c}
HO-CH_2-CH_2 \\ \diagdown \\ N-CH_2CH_2-N \\ \diagup \\ HOOC-CH_2
\end{array}
\begin{array}{c}
\phantom{x}CH_2-COOH \\ \diagup \\ \phantom{x} \\ \diagdown \\ \phantom{x}CH_2-COOH
\end{array}$$

$+$ ortho phosphoric acid
$$\begin{array}{c} HO \\ \diagdown \\ HO-P=O \\ \diagup \\ HO \end{array}$$

$\downarrow$ $$\begin{array}{c}
HO \phantom{x} O \\ \diagdown \phantom{x} \| \\ P-O-O-C-CH_2 \\ \diagup \\ HO
\end{array}
\begin{array}{c}
\phantom{xx} \\ \diagdown \\ N-CH_2-CH_2-N \\ \diagup \\ HOOC-CH_2
\end{array}
\begin{array}{c}
\phantom{x}CH_2-COOH \\ \diagup \\ \phantom{x} \\ \diagdown \\ \phantom{x}CH_2-COOH
\end{array}$$

$\downarrow$ excess $$\begin{array}{c}
\phantom{xxxx} CH_2-CO-O-P \\ \diagup \phantom{xxxxxxxxxxx} \diagup \phantom{x} \diagdown \\
-N \phantom{xxxxxxxx} OH \phantom{x} OH \\ \diagdown \phantom{xxxxxxxxxxxxxxxxx} OH \\ \phantom{xxxx} CH_2CO-O-P \\ \phantom{xxxxxxxxxxxxxx} \| \phantom{x} \diagdown \\ \phantom{xxxxxxxxxxxxxx} O \phantom{xx} OH
\end{array}$$

Reactions using pyro- and tripolyphosphoric acid:
In place of the ortho acid, polyphosphoric acids may be employed in the above examples. With pyrophosphoric acid, the types of products are:

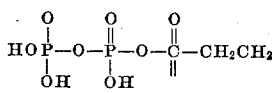

With tripolyphosphoric acid, the reaction product types are:

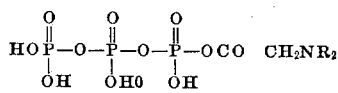

Addition products as shown are phosphoric acid and amino acid anhydrides.

(1) They are more stable than the anhydrides described in Examples I–XII (although solutions of these anhydrides appear to be stable on long standing); and (2) The phosphate function in ester form exhibits strong auxiliary chelating ability at any pH, but specifically at alkaline pH, at which the simple basic phosphates, which are precipitating agents, especially of polyvalent ions such as $Fe^3$, are not useful. They are more stable than the respective chelating agents used to form the phosphate anhydride. The esters form strong chelates with divalent and polyvalent metal ions, including such ions as $Th^{4+}$, $U^{4+}$, $Zr^{4+}$ and other ions not normally complexed satisfactorily with the amino acid type chelating agents, for example EDTA, and which are, as a rule, precipitated by phosphates above pH 6 in the form of insoluble metal phosphates.

Metal chelates formed are represented as follows:

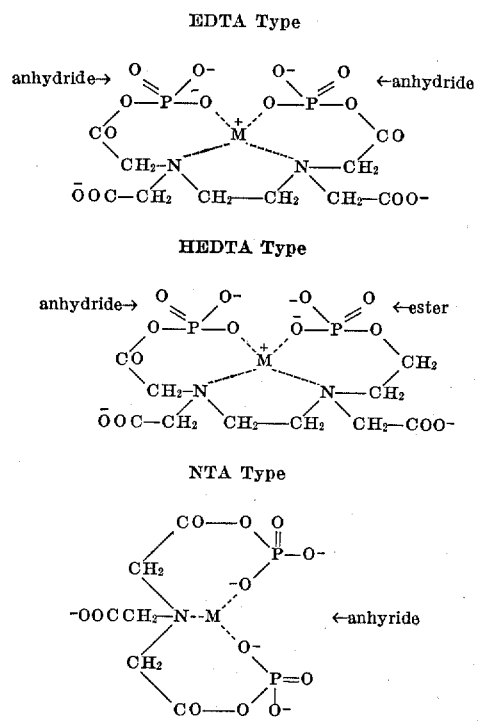

EXAMPLE XVIII

The following was reacted:

NTA—20 grams
Polyphosphoric (115% $H_3PO_4$)—30 grams

The phosphoric acid is added to the dry NTA (nitrilotriacetic acid). There is not much heat of reaction, but a soft dough-like product is obtained. When allowed to stand, heat is generated with discharge of water. The whole mass foams. When it is stirred, the dough-like product forms. The whole is then dissolved in boiling water (about 150 cc.). Two products are obtained: (1) a solid weight; filtered; (2) a soluble portion which does not crystallize on long standing. Dry in vacuum.

The iron chelate of both products is a greenish yellow solution at pH 11.

EXAMPLE XIX

The following are reacted:

Hydroxy ethylenediaminetriacetic acid—29 grams
Polyphosphoric acid (115% $H_3PO_4$)—35 grams A very soft dough is formed with no heat of reaction when the materials are dry mixed. On standing at 35° C., internal reaction takes place with water discharge producing a foamy product. When it is stirred the soft dough forms. This product is completely soluble in methanol. The $Fe^3$ chelate is red at pH 11. The chelate will crystallize to form hydrated red crystals.

EXAMPLE XX

The following are reacted:

Tri methyl ester of NTA—20 grams
$H_3PO_4$ (85%)—20 grams

Slowly, with good cooling, add the $H_3PO_4$ to the ester. There is heat of reaction. $CH_3OH$ is given off. The product is a viscous water-clear resin. The iron chelate is yellow at pH 10 and higher.

EXAMPLE XXI

The following are reacted:

EDTA tetra methyl ester—20 grams
$H_3PO_4$ (85%)—30 grams

As in Example XX. The viscous resin produced is clear. The iron chelate is deep yellow at pH of 10+.

EXAMPLE XXII

The following are reacted:

Tri ester of hydroxy ethyl ethylenediaminetriacetic acid—20 grams
$H_3PO_4$ (85%)—20 grams The product is a clear viscous resin. The $Fe^3$ chelate is deep yellow at pH 10+.

All of the above esters may be used in the form of disproportioned ester, mono, di, or poly. The results are comparable to the fully esterified products.

Ortho phosphoric acid forms acid soluble salts with polyvalent metal ions, for example, acid soluble ferric phosphate; however, when the pH of such solutions is raised to as low as 4, ferric phosphate and/or ferric hydroxide is precipitated.

The ortho phosphates do not form soluble complexes with polyvalent metal ions. The ortho phosphates may be used as precipitants in evaluating chelate stability, for example, iron, in solutions ranging in pH from 4 to alkaline.

In this application, we observe and demonstrate an unexpected result: The ferric chelates of the compositions cited in the examples are stable in pH solutions from 4 to alkaline. This appears to be due to chemical bonding of the ortho phosphate to the organic chelating compounds in examples.

The poly phosphates are themselves chelating or sequestering agents; Charberek and Martell, "Organic Sequestering Agents," John Wiley & Sons, New York, pp. 299–301. However, as the concentration of metal ions increases from 10 to 20 parts per million, the amount of poly phosphate needed increases to about 3 times theory: from 20 to 40 parts per million, about 4 times. This indicates that about 3 to 4 moles of poly phosphates are involved in binding a single metallic ion. When, however, a poly phosphoric acid is condensed with, for example, hydroxy ethyl ethylene diamine triacetic acid, the ratio of metal ion to the condensed product is at least 1:1 and is stable in any pH solution. Substituting a poly phosphoric acid for ortho phosphoric acid, the chelation effect of the anhydride and/or ester composition is striking. The value becomes more linear and the color of, for example, Fe chelate, changes, going from water-white (polyphosphate) to slightly yellow, to yellow-green solution, to red. The color apparently is a function of organic chelate present.

The mixed anhydrides of EDTA disclosed herein have new, unusual, and important applications:

(1) They provide good sequestering agents for metals, and particularly for alkaline earth metals, which function in both acid and alkaline solutions. This is a definite advantage over EDTA, which sequesters alkaline earths only in the alkaline pH range, and which precipitates in strong acid solutions. It is also an advantage over the polyphosphates, which are not good sequestering agents at high pH, where the tendency of the alkaline earths and other metals to precipitate is greatest.

(2) The solid crystalline sequestering agents (the mixed anhydrides) are non-hygroscopic and may be stored indefinitely in contact with air and maintain freeflowing character. Thus, the hygroscopic property of phosphoric acids and of the phosphoric acid anhydrides is bypassed.

(3) The sequestering action for mixtures of metals is quite efficient, since the high affinity of EDTA for transition metals and heavy metals is retained in these products. Thus, a small amount or a trace of heavy metal mixed with larger amounts of alkaline earth metals, a common situation encountered in industrial problems, is completely sequestered by a single reagent.

(4) The chelates of essential metals, particularly Fe, Zn, and Mn, are of superior value in plant nutrition since they provide available phosphate as well as the required metal. Also, they are more strongly adsorbed on soil particles and less easily leached away than is the case of the lower molecular weight chelates, such as those formed by EDTA, HEDTA, and DTPA alone.

The compositions are also useful in boiler treatment and many other uses in which the complexing action of an organic chelating agent and the sequestering action of the phosphate is desirable.

In recapitulation, when ortho phosphoric acid and its polymers and dehydration products, EDTA, NTA, and analogues are condensed by any means, excellent chelating compositions can be produced. $Fe^3$ chelates of such compositions are water-white to wine-red, stable in alkaline solutions. The color appears to be a function of percentage of organic chelate present in the condensate. For example, 10 grams $H_3PO_4$+15 grams of NTA will give a white ferric chelate. 30 grams of NTA to 100 grams $H_3PO_4$ will give a wine-red solution at pH 9. The stoichiometric relation of NTA to ferric ion normally is 2 to 1. I have observed that the 30 grams NTA composition will complex more ferric ion than the NTA calls for (1½+). At this concentration, the chelate solution is yellow at 6 and red at 7+.

A second and important observation is as follows:

Physical mixtures of Na phosphate and NTA, EDTA, will not form clear solutions in the presence of even small amounts of ferric ion. Even when the phosphate is mono sodium ortho phosphate and the pH of solution is 6, ferric phosphate is formed and precipitates.

However, when the respective acids are well mixed, Fe added, and then the pH is raised, a good water-white chelate solution is formed. The pH may be raised to above 6. Apparently, condensation takes place by simple mixing of the acids and may be completed by simple heating to or at comparatively low temperatures. In short: phosphoric acid-organic ligand condensates.

$NaH_2PO_4$+EDTA +Fe ions;  yellow; cloudy
       or NTA   raise pH; precipation of ferric
                                phosphate (?) and
                                hydroxide.

$H_3PO_4$+EDTA+Fe ions; clear white at pH 6+
       NTA                 reddish at 8+

While ortho phosphoric acid is used in the above observation, polyphosphoric acids are equivalent and the condensation products combine and enhance the chelating properties of each sequestrant. The ortho phosphoric acid products point up to the surprising effect when one combines the phosphoric acids with the acids of known organic ligands.

In preparation of the compositions, therefore, reaction of the organic acid with phosphorus acid is carried out usually on a 1:1 molar basis, basing the molar count on the carboxymethyl groups of the acid and the elemental phosphorus. Thus, EDTA has four moles of —COOH available for reaction and it is reactable with four moles of a phosphorus acid. Since there are four —COOH groups on the EDTA and two or three —OH groups on the phosphorus, the reaction immediately is rendered complicated. The combinations described in the examples are effective for making useful compositions and generally the proportions of reactant may be from one mole of phosphorus acid per —COOH group to one mole of polycarboxylic acid per —OH group in the phosphorus acid.

Thus, a significant experiment using a preformed, commercial $Fe^3$ chelate+$H_3PO_4$ under various conditions is done as follows:

The test $Fe^{3+}$ chelate used is iron chelate (U.S. Patent 2,407,645). Iron chelate of hydroxy ethyl ethylene diamine tri acetic acid. This chelate is stated to be useful in agriculture in acid, alkaline and calcareous soil. Versonol is hydroxy ethyl ethylene diamine tri acetic acid, HEDTA.

(I)

HEDTA $Fe^{3+}$ chelate—5 grams
$H_3PO_4$ (86.6%)—20 grams
Water—150 milliliters This formed a clear yellow solution; now raise pH to 3.5+ with $Na_2CO_3$, cloudy, and, after 10 minutes, a gray precipitate, iron phosphate. Now: boil down; precipitate increases with concentration. However, when concentrated, clearing begins when only 18% of water is present. Reddish yellow and clear when 14% water is left. This can now be diluted to any value and the pH raised to 9.

(II)

HEDTA $Fe^{3+}$ chelate—5 grams
$H_3PO_4$ 115%—10 grams

Mix dry and age for ½ to 1 hour at 40° F. Dilute to 100 milliliters. Neutralize with base to pH 9+. This composition remains clear, is stable to storage and to boil. Can be concentrated to a crystalline compound and redissolved repeatedly.

A significant rearrangement has taken place in the Example II.

The following illustrate this method of making the compositions:

EXAMPLE XXIII

In an open beaker, combine

NTA—30 grams
$H_3PO_4$ 85%—100 grams
Water—150 milliliters

Agitate well; heat and evaporate the water.

There is no solution at any time. When about half of the water is evaporated, temperature about 105° C., a semi-solution forms. At 110° C. with only 25 cc. of the water left, fusion takes place. There is an odor of formaldehyde. There also must be $CO_2$ formed by the oxidation of one or more of the carboxy methyl groups of NTA. Water is one of the reactants:

$$CH_2COOH + H_2O \rightarrow CH_2O + C_2CO_3$$

This decomposition does not detract from the technical usefulness of the resulting product. Final product out: 132 grams. It is a heavy syrup, crystallizing on top, hydrated acid crystals.

50 grams of this syrup is added to 100 milliliters of water and heated to 60° C. Crystals are obtained.

The $Fe^3$ chelate of the syrup or the solids is quite colorless at acid pH, turning to wine-red at pH of 11. The complex is quite stable on standing and is not precipitated by soap or oxalate.

EXAMPLE XXIV

Combine the following reactants in water, reflux and stir:

NTA—30 grams
$H_3PO_4$ 86%—100 grams
Water—200 milliliters

Object: To see if solubility can be achieved in a given time, i.e. production of phosphate analogue to $H_2SO_4$ and tertiary amino acids.

Observations
  1 hour at reflux slurry
  2 hours at reflux slurry
  3 hours at reflux slurry
  4 hours at reflux slurry Invert condenser to take off water. Water is not easy to take off.

| Hours: | Milliliters |
|---|---|
| 2 | 45 |
| 3 | 60 |
| 4 | 30 |
| Total water off | 135 |

Cool and filter.

Filtrate and $Fe^3$-colorless $Fe^3$ chelate at acid pH; slightly yellow at alkaline pH. On standing and evaporating at 40° C., long, clear crystals form.

The liquor is yellow and probably the $Fe^3$ chelate. The solids: form clear colorless $Fe^3$ chelate at acid pH. Color changes as pH of solution is raised; pH 6 to 7—yellow; pH 9+ red. This experiment indicates that the carbonyl amino acid complex can be formed in water.

EXAMPLE XXV

In this experiment, the solvent is tetra hydro furan (THF). NTA and other amino acids are quite soluble in this solvent. Combine in a vessel:

THF—50 milliliters (not enough solvent)
NTA—19 grams (191 M.W.)
$H_3PO_4$—20 grams (100 M.W.)

Note NTA—$H_3PO_4$ ratio. It is sufficient to react with 2 carboxy methyl groups of NTA.

As indicated, this is not sufficient THF, but the resulting product is very interesting. Reflux mass over a period of 6 hours. It was a nice crystalline slurry. The time can be shortened materially. Let cool and filter. 34 grams of granular solids out. The reddish filtrate was concentrated under vacuum to a syrup but not sufficient to keep. Both fractions chelate $Fe^3$ in acid or alkaline solution. The color is wine-red at pH of 9 and above. It is not precipitated by soap.

EXAMPLE XXVI

NTA+$H_3PO_4$ was reacted in methanol as follows:

Methanol—30 milliliters
NTA—40 grams (⅕ mole)
$H_3PO_4$ 86+%—50 grams (½ mole)

(There is not much temperature rise when the materials are mixed.) Reflux, agitate and heat. React for a period of 2 hours; then invert condenser and take off methanol. Heat for 4 hours total. (Note: A sample of material was taken after 1 hour. It showed good $Fe^3$ chelation characteristics, so the time factor could be shortened.) Filter hot. Solids out 40 grams of powder when dry. This material is excellent for chelation of transition elements and di-valent metals.

EXAMPLE XXVII

React:
  EDTA—15 grams (1/20 mole)
  $H_3PO_4$—16 grams (⅙ mole)

in 250 milliliters methanol, reflux with agitation for 8 hours. A gas appears to come off; slightly acid to lithium. Take off 170 milliliters methanol and filter hot. Obtained 20 grams of a white powder. The product is not unlike EDTA itself. It is insoluble in cold water, but soluble in hot (boiling) water from which glass-clear crystals are obtained. The $Fe^3$ chelate is stable at pH 9, red.

The $Fe^3$ chelate, in fact any of the chelates mentioned, is made by first forming an aqueous solution of the chelating agent of a desired concentration and adding to it an aqueous solution of an $Fe^3$ salt, such as the sulfate. The ratios are one mole of metal ion to one mole of chelating agent, generally. Stability of the chelate is judged by appearance of the solution. Its stability over pH range is judged by altering pH with acid and alkali. Storage and observation are the only basis for judging stability. If the chelate stands, in solution for many days or months without hydrolyzing, it is exceptionally good. Usually, performance is adequate if stability for several hours is obtainable.

The structure can be expressed as a mixed anhydride formed by the direct union of a carboxyl and phosphoric acid moiety to give the structural type:

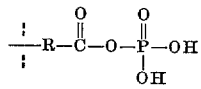

R being one of the methylene carboxylic acids of the amino acid reacted, the structure appearing at least once in the reaction product. To illustrate the various methods, the following was carried out using EDTA and 100% excess $H_3PO_4$, 85.6% solution on the basis of one mole —$CH_2COOH$ per mole of phosphorus:

TABLE I

| Temperature, °C.: | EDTA added in each step, grams | Observations |
|---|---|---|
| 50 | 5.0 | Water-clear. |
| 60 | 2.0 | Do. |
| 70 | 2.0 | Do. |
| 80 | 2.0 | Sl. cloudy; clears gradually. |
| 100 | 2.0 | Do. |
| 110 | 2.0 | Sl. cloudy; bubbles formed plus odor of $CH_2O$. |
| 110 | 3.0 | Cloudy at first; then clears |

The final temperature was allowed to reach 132° C., within one hour from the first addition of EDTA. The final solution was again pale yellow, but quite clear.

The following table summarizes some additional details of the preparations.

Using water as the solvent, the mixture is evaporated to fusion:

TABLE II

| Type of Amino acid | Grams | H₃PO₄, 85.6% | Water, ml. | Temperature and point of fusion | Notes on fusion | Fe³ chelate of product, pH color | Solution of chelate boil |
|---|---|---|---|---|---|---|---|
| NTA | 30 | 100 | 150 | 100° C. at 82%, complete at 88% | No decomposition | White at pH 6; yellow at pH 7; reddish at pH 8+. | Stable. |
| EDTA | 30 | 100 | 150 | 105° C. at 84%, complete at 90% | Slight odor of CH₂O₇ CO₂ off. | do | Do. |
| DETPA | 20 | 100 | 150 | 100° C. at 80% | do | do | Do. |
| HEDG | 30 | 100 | 150 | 105° C. at 80% begins to form solution but still opaque, complete at 82% but raise to 90%. | No decomposition; clear reddish resin. | do | Do. |
| HEDTA¹ | 30 | 100 | 150 | This comp. is quite soluble in hot water with formation of lactone; however, the same slurries are obtained in presence of H₃PO₄ but become resinous and clear on concentration. | No decomposition | do | Do. |
| DHEDA | 30 | 100 | 150 | This composition is quite soluble in hot water with formation of lactone; however, the same slurries are obtained in presence of H₃PO₄ but become resinous and clear on concentration. | do | do | Do. |
| Chel 38 | 30 | 100 | 150 | This will fuse when concentration is 88%; and syrup at 92%. | do | do | Do. |

¹ Note a variance attached.
Water may be increased to 250 milliliter without materially changing the conditions.

Using H₃PO₄ 85.6% as the solvent:

TABLE III

| Type of Amino Acid | Grams | H₃PO₄ | Temp. | Notes | Fe³, pH color | Notes on chelate |
|---|---|---|---|---|---|---|
| NTA | 20 | 50 grams 85.6%, 10 grams H₃PO₄. | 70° C. to 100° C | Syrup | Yellow at pH 6; red at pH 10 | Stable. |
| EDTA | 15 | do | 80° C. to 95° C | Semi-solid slurry | do | Do. |
| HEDTA | 20 | do | 100° C | Syrup | do | Do. |
| DTPA | 15 | do | 90° C | do | do | Do. |
| DCTA | 15 | do | 100° C | Semi-solid slurry | do | Do. |
| NTA | 20 | 115% H₃PO₄, 40 grams. | Dry mix 1 hr. at 40° C | Dough-like | Greenish yellow at pH 7 to 11 | Do. |
| HEDTA | 25 | 35 grams | do | Soft dough, completely soluble in methanol. | Reddish-yellow at pH 6; red at pH 11 | Do. |

It appears that all products and/or compositions of the fusion series are mixed anhydrides in compounds consisting of tertiary amino methylene carboxylic acid. Schematically these may be postulated as follows:

EDTA Type

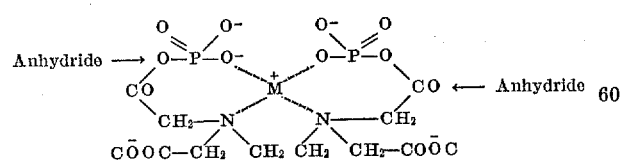

HEDTA Type

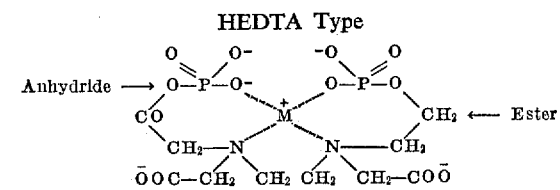

NTA Type

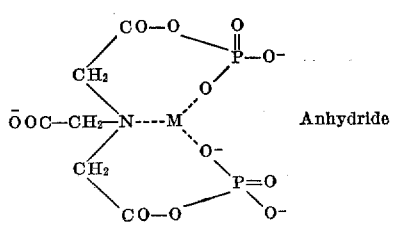

In compounds having 1 or more carboxy methyl groups replaced by hydroxy ethyl, hydroxy propyl, hydroxy iso propyl.

In this rendition it may be seen that ester and/or anhydride groups are present.

Derivatives of amino poly acetic acids may be used; they are of 2 types:
 (1) The acid salts of the amino acids (sulfate),
 (2) The methyl esters or partial esters of the amino acids.

TABLE IV

| | H3PO4, 85.6% grams | Condition | Fe³ chelate, pH color | Boil |
|---|---|---|---|---|
| Sulfate Salts, grams: | | | | |
| EDTA sulfate, 10 | 40 | Melt 50° C., white solid | White at acid pH; white at pH 7; light yellow at pH above 7. | Stable. |
| EDTA sulfate, 20 | 40 | Melt 60° C., white solid | White at acid pH; white at pH 7; reddish at pH 11. | Do. |
| NTA sulfate, 20 | 50 | ___do___ | White at acid pH; white at pH 7; golden at pH 11. | Do. |
| HEDTA, 20 | 50 | Melt 60° C., semi-solid | Yellow at acid pH; yellow at pH 7; reddish-yellow to red at pH 11. | Do. |
| Methyl Esters, grams: | | | | |
| EDTA tetramethyl ester 34% solution, 20 | 20 | Heat to 80° C. methanol off, clear syrup | White at acid pH; yellow at pH 7; reddish-yellow at pH 11. | Do. |
| EDTA tetramethyl ester 34% solution, 20 | 30 | ___do___ | ___do___ | Do. |
| NTA trimethyl ester 36% solution, 20 | 20 | ___do___ | White at acid pH; yellow at pH 7; yellow at pH 11. | Do. |
| HEDTA 35% solution, 20 | 20 | ___do___ | White at acid pH; yellow at pH 7; reddish at pH 11. | Do. |

The following additional compositions were made using the mono sodium salt of nitrilo tri acetic acid (NTA):

Na.H$_2$PO$_4$.H$_2$O (138)—26 grams
NTA (177)—10 grams
Water—100 milliliters

In open beaker with stirrer, heat and evaporate water. No homogeneous solution is formed at any time until about 40 milliliters of water has evaporated. At this point, a pink to red color appears and fair solution is obtained. This color intensifies as the composition is concentrated. Stop when about 80 milliliters of water have been taken off. Cool and filter. The filtrate is quite pink. I believe this color is due to iron impurity in the starting materials and which is not complexed until initial chemical bonding of the two reactants is fairly complete. The solids also have a pinkish cast, but can be washed clear. Fe³ is practically colorless at acid pH, but wine-red at alkaline pH.

Using a combination of phosphoric acids (different sources) and NTA:

H$_3$PO$_4$ 85%—50 grams
H$_3$PO$_4$ 115%—50 grams

The two acids are thoroughly mixed in a closed container. At 45 to 50° C. NTA is added in 10 grams amounts until a total of 35 grams has been added, ½ hour. This composition is very manageable. There is no lumping, but is an easily stirred slurry. Raise temperature to 55° C. and react at this temperature for 4 hours; semi-liquid resin.

Fraction I—remove 50 grams. Balance, 85 grams, is now further reacted at 55 to 60° C. under mild vacuum for a period of 4 hours. 8 grams are lost, probably mostly CO$_2$. The residue is a clear resin. There is no odor of CH$_2$O.

Fraction II—10 grams of this resin into 40 milliliters of water will precipitate a white hydrated solid combination acid, the carbonyl phosphate derivative of NTA. Both materials will chelate Fe³ in stoichiometric proportions at any pH. The chelate is only slightly yellow at pH of 11, stable at the boil, in the presence of ortho phosphate, soap or sodium oxalate.

Tetra hydro furan (THF) is a fair solvent for amino poly acetic acids. A test in this solvent was made as follows:

THF—50 milliliters
NTA—19 milliliters (191 M.W.)
H$_3$PO$_4$ 85+%—20 milliliters (100 M.W.)

Note NTA—H$_3$PO$_4$ ratio. It is sufficient to react with 2 carboxy methyl groups of NTA. This is not sufficient THF, but the resulting product is very interesting. Reflux mass over a period of 6 hours. It was a nice crystalline slurry. The time can be shortened materially. Let cool and filter. 34 grams of granular solids recovered. The reddish filtrate was concentrated under vacuum to a syrup but not sufficient to keep. Both fractions chelate Fe³ in acid or alkaline solution. The color is wine-red at pH of 9 and above. It is not precipitated by soap, sodium ortho phosphate or oxalate.

Uses—Besides normal and obvious uses of products, the condensed products are useful in:

(1) Oil well treatment such as fracturing, sometimes called acidizing. At present, buffered 10% HCl is used. However, the pH of this solution quickly rises to 3 and 4 due to Ca carbonate. At this pH, Fe³ ions are precipitated in the form of ferric hydrate gel. This gel quickly forms a cement. The compositions herein disclosed do not precipitate a ferric hydrate or hydroxide. Amino acids have been used, but they must be used at pH above 7 and are effective only on di-valent metal ions such as Ca, Mg, etc. Any ferric ions are precipitated at this pH.

(2) Metal treating.—It was found that the compositions are excellent rust removers. Badly rusted nails and steel brackets were immersed in a 10% solution of the NTA+EDTA condensed acids, pH of 2. The rust was removed. An anodized film also developed completely inhibiting rusting on long time exposure to warm, humid atmosphere. This should be of value in boiler tube cleaning.

What is claimed is:

1. An anhydride reaction product formed when a phosphorus acid compound is reacted with a polyamino polycarboxylic acid chelating agent to form a condensation product, at least in the proportion of about one mole of phosphorus and one mole of —COOH of the chelating agent temperature conditions to remove volatile by products of the anhydride forming reaction.

2. The reaction product in accordance with claim 1 formed by reaction between a compound defined by the formula

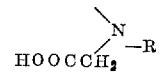

wherein
R is

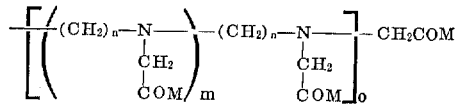

$m = 0-4$
$o = 0, 1$
$n = 2, 3$ and —COM is independently selected from the group consisting of COOH, —COONa, —COOK, —COONH$_4$, and —COO alkyl, not more than two COM's being —CH$_2$OH, and a phosphorus acid compound selected from the group consisting of phosphorus oxides, ortho phosphoric acid, meta phosphoric acid, pyro phosphoric acid, alkali metal salts thereof and acid-alkali metal salts thereof.

3. A compound in accordance with claim 2 which is the reaction product of nitrilo triacetic acid and a phosphoric acid.

4. A compound in accordance with claim 2 which is the reaction product of ethylene diamine tetra acetic acid and a phosphoric acid.

5. A compound in accordance with claim 2 which is the reaction product of hydroxy ethyl ethylene diamine triacetic acid and a phosphoric acid.

6. A compound in accordance with claim 2 which is the reaction product of nitrilo triacetic acid, a phosphoric acid and phosphorus pentoxide.

7. A compound in accordance with claim 2 which is the reaction product of ethylene diamine tetra acetic acid, phosphoric acid and phosphorus pentoxide.

8. An anhydride reaction product of ethylene diamine tetra acetic acid and phosphoric acid of concentration greater than 100%.

9. An anhydride reaction product of nitrilo triacetic acid and phosphoric acid of concentration greater than 100%.

10. An anhydride reaction product of hydroxy ethyl ethylene diamine triacetic acid and phosphoric acid of concentration greater than 100%.

11. The method of forming a complex phosphorus acid chelating agent composition which comprises mixing a chelating compound selected from the group defined in claim 2 with a phosphorus acid compound selected from the group defined in claim 2, heating the mixture to a volatile by product removal temperature in the range between 50° C. and 150° C., maintaining the mixture at the reaction temperature to complete evolution of reaction by products at that temperature and recovering the reaction product.

No references cited.

CHARLES B. PARKER, Primary Examiner

A. H. SUTTO, Assistant Examiner

U.S. Cl. X.R.

106—14; 252—8.55, 82, 147, 389; 260—2, 429, 429.1, 429.3, 439, 920, 933, 982, 988